United States Patent
Hemli et al.

(10) Patent No.: US 8,254,251 B2
(45) Date of Patent: Aug. 28, 2012

(54) MESH HYBRID COMMUNICATION NETWORK

(75) Inventors: Ronel Hemli, Givat Shmuel (IL); Ofir Appelbaum, Givat Shmuel (IL)

(73) Assignee: Mobix Wireless Solutions Ltd., Petach Tikva (IL)

( * ) Notice: Subject to any disclaimer, the term of this patent is extended or adjusted under 35 U.S.C. 154(b) by 412 days.

(21) Appl. No.: 12/364,727

(22) Filed: Feb. 3, 2009

(65) Prior Publication Data

US 2010/0195498 A1 Aug. 5, 2010

(51) Int. Cl.
*H04L 12/26* (2006.01)
*G06F 11/00* (2006.01)

(52) U.S. Cl. .................. 370/228; 370/237; 714/4.1

(58) Field of Classification Search .............. None
See application file for complete search history.

(56) References Cited

U.S. PATENT DOCUMENTS

| 2004/0165525 A1* | 8/2004 | Burak .................. 370/228 |
| 2005/0022046 A1* | 1/2005 | Cheng et al. .............. 714/4 |
| 2008/0129537 A1* | 6/2008 | Osterloh et al. ........ 340/870.02 |

OTHER PUBLICATIONS

International Search Report of Application No. PCT/IL10/00094 mailed on Jun. 2, 2010.

* cited by examiner

*Primary Examiner* — Clemence Han
(74) *Attorney, Agent, or Firm* — Pearl Cohen Zedek Latzer, LLP

(57) ABSTRACT

A communication network comprises a plurality of physical media. The physical media may be sensitive to disturbances that are different from one physical medium to another, such that a failure in one physical medium may not effect communication in other physical medium of the communication network. The nodes of the communication network comprise a plurality of physical layers units and MAC units pairs, each pair connected to a different physical medium. The transfer of massages among the network nodes on the plurality of different physical media is done in a transparent way by upper layers of communication unit of the network nodes.

24 Claims, 2 Drawing Sheets

MESH HYBRID COMMUNICATION NETWORK

BACKGROUND OF THE INVENTION

Multi-station network may face communication difficulties. In mesh networks communication difficulties, such as blocked paths leading to one or more network stations or end-units, may be solved using alternative communication path or paths via, for example, one or more stations in the mesh network. However, even in mesh networks there maybe situations in which communication to one or more stations is blocked at least for some time. This situation is undesired especially when undisturbed and viable communication is essential for one or more stations.

SUMMARY OF THE INVENTION

A communication method comprising a plurality of physical media is disclosed. The communication network comprising a first physical medium connected to a plurality of nodes and at least one additional physical medium, wherein at least some of the nodes are connected to at lease one of the additional physical media.

The node in the communication network comprising a plurality of physical layer units at least some of the plurality of physical layer units are connected each to one of a plurality of different physical media and to one of different media access control units, the physical layer units to transfer data between said respective physical media and respective media access control units.

The node also comprising a data link layer comprising a media access control layer comprising a plurality of media access control units, each connected to a one of the physical layer units and to a single logical link control unit, the media access control units to handle communication with said respective physical layer units. The data link layer also comprising a logical link control layer comprising a single logical link control unit connected to the media access control units and to a communication unit to support data transfer between the communication unit and the media access control units, the logical link control unit is further to provide flow control acknowledgment and error recovery mechanisms to specify which mechanisms are to be used for addressing other network nodes over said communication network, and to forward massages sent between other nodes of said communication network.

The node also comprising a communication layer comprising a commnunication unit connected to the logical link control unit to support network, transport, session, presentation and application layers of the hierarchical communication model. The communication unit of the node uses the different physical media of the communication network in a transparent way.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
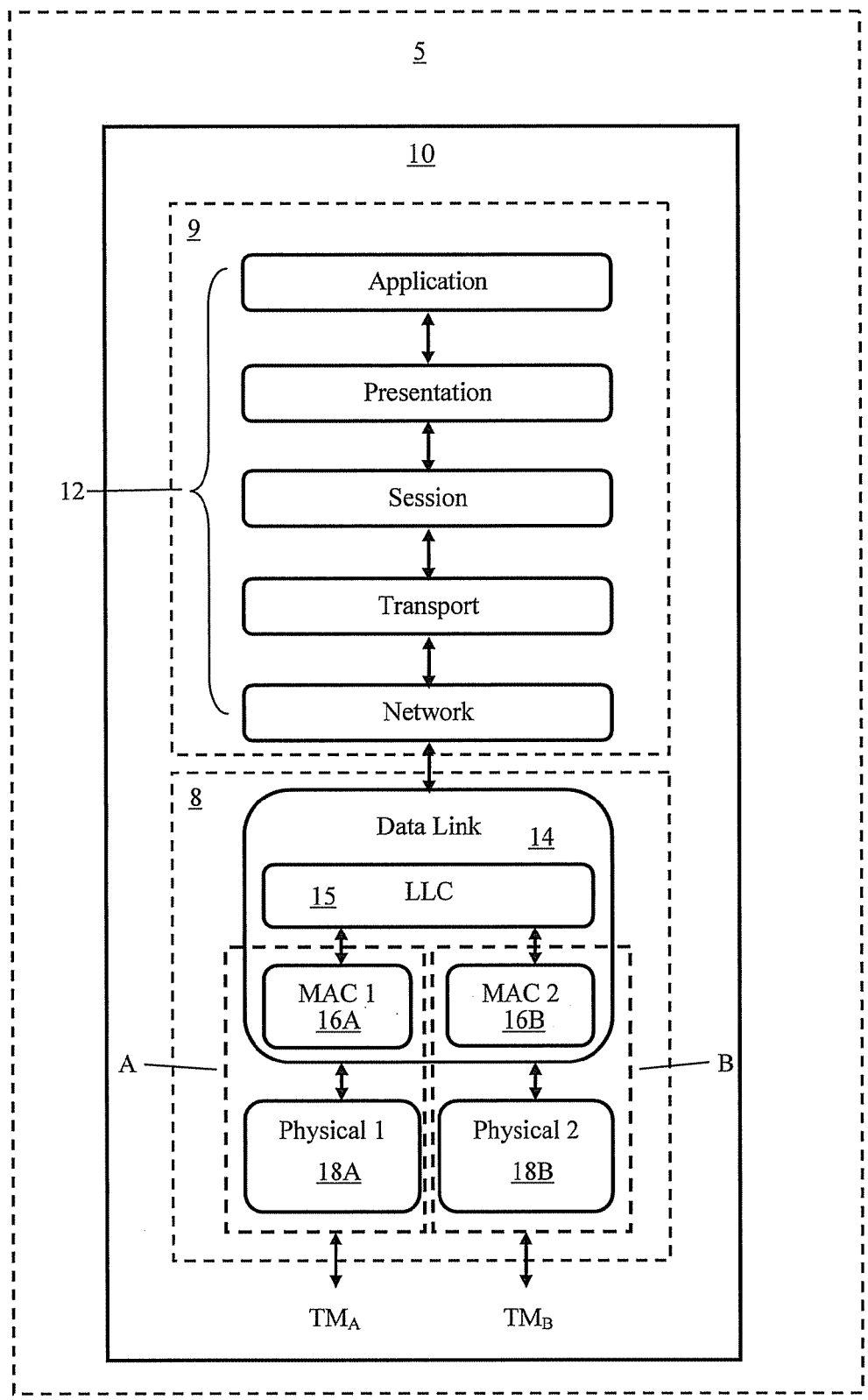
FIG. 1 is a schematic block diagram illustrating an end-point device in a communication network with a communication model according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A communication system may typically include repeating node or nodes in order to cover a predefined area or a predefined group of end units with alternative paths of communication. Since each end unit has inherently communication capabilities it is possible to use each unit as a repeater which may communicate data and/or content etc. to another end unit for example by establishing a by-pass path. An example for such a configuration is a Mesh network.

Even when a mesh network is deployed and the communication is transferred between all units there are cases where a unit is blocked and cannot communicate with any other unit because of, for example, physical medium failures which may cause permanent or temporary communication interference. The interference may have many characteristics and appearances typical to each physical medium. Higher levels of the communication model can correct some errors but when the ability required for overcoming the existing communication problem is greater than the built-in correcting mechanism ability, there is no action that can be taken automatically by the network to overcome the communication problem in upper layers.

Known communication systems comprise a single physical medium to deliver the data. A system according to embodiments of the present invention may comprise more than a single physical layer. Modifying the basic level (physical layer and Data Link layer) of the OSI model implemented in network nodes may allow adding a new dimension of communication within hybrid mesh networks and thus to create a new approach for network implementation. Embodiments of the present invention may introduce a new level of reliability in data transfer. Embodiments of the invention allow the use of multiple physical media in a communication system. These different physical media not only enhance redundancy of the basic layer of the communication model but also enable significant improvements to the link and network layers as well.

Reference is made now to FIG. 1, which is a schematic block diagram illustrating an end-point device 5 in a communication network with a communication system 10 implementing a communication model according to embodiments of the present invention. End-point device 5 may be any type of a member in a communication network, for example in a mesh network. Additionally, end-point device 5 may comprise interface means (not shown) to provide for receiving and/or transmitting data and/or control signals from/to one or more peripheral units such as, but not limited to, electrical meter, water meter, gas meter, energy meter, heating meter and the like. End-point device 5 may comprise communication unit 10 to perform and administer communication to and from end-point device 5. Communication unit 10 may comprise communication module 8, which may be part of communication unit 10 or may be in active communication with communication unit 10. Communication unit 10 of end-point device 5 may implement one or more layers of a communication model, which may substantially conform to standard hierarchical communication models, such as the OSI model. In the embodiment illustrated in FIG. 1 at least one communication unit 9 may be provided to implement high level, multi-layer 12 section of a communication model supporting several layers of the communication model, such as Network, Transport, Session, Presentation and Application, as is done, for example, in the OSI model layers Network to Application. Communication module 8 may implement lower layers of a communication model. Communication module 8 may implement data link layer 14 which may function next under high level multi-layers 12. Data layer 14 may comprise, according to embodiments of the invention, a logical link control (LLC) sub-layer unit 15, comprised within or functions in communication with communication module 8 to implement a LLC sub-layer and at least two Media Access Control (MAC) units 16A and 16B, each of the MAC units functioning in communication with LLC unit 15. Communication module 8 may further comprise one physical layer unit 18A, 18B for each MAC unit 16A, 16B, communicating respectively with MAC units 16A and 16B.

Physical Layer

Physical Layer units 18A and 18B may be adapted to translate communication requests received from the Data link layer 14 implemented by communication module 8, and more specifically from MAC units 16A and 16B, to performance of hardware-specific operations to affect transmission or reception of electronic signals. Physical layer units 18A and 18B may be adapted to support higher-level functions in a communication network unit 10. Physical layer units 18A and 18B may be adapted to define the means of transmitting raw bits rather than logical data packets over a physical medium connecting network nodes.

Each physical layer unit 18A, 18B may have its own characteristics of electrical, mechanical and procedural interface to the respective physical media $TM_A$, $TM_B$ and its own shape of electrical connectors, frequencies and modulation schemes, etc. These parameters may define the behavior of a specific physical layer, thus they may also define the possible interference and other kinds of problems that can occur in this specific implementation to the respective physical medium. Utilizing more than one physical medium, so that there are more than one type of physical media, may allow the physical layer of an end unit to continue data transmission requested by the data link layer despite a failure of several of its physical media, for example one physical medium of its physical media in the example of FIG. 1, utilizing, for example, the remaining one or more physical media. Thus practically, according to the embodiment of FIG. 1 of the invention, communication unit 10 may support, for a single network node, two physical media A and B using a single communication unit. It should be noted that the presentation of communication unit 10 with two physical channels A and B is done as an example and more physical media may be supported and operated by one or more of end-point device 5.

When more than one physical medium is used by a single network node, or end-point device, the different characteristics of each physical medium may limit the influence of interferences, which are unique to the specific physical medium, on the other available physical media. For example, in a mesh network system utilizing both wired and wireless physical media, radio interference are not expected to have an effect on the wire transmissions and symmetrically if the wire is cut or broken no change in the performance of the radio-based medium is expected.

Data Link Layer

Data Link Layer 14 of communication module 8 may be adapted to transfer data between nodes of the same local area network. Communication module 8, implementing Data link layer 14, may provide the functional and procedural means to transfer data between network nodes and can provide means to detect and correct errors that may occur in the physical layer. The data link may provide data transfer across the physical link. However this transfer may be unreliable in some cases. Data link layer 14 can be considered as comprising Media Access Control (MAC) 16 sub-layer and Logical Link Control (LLC) 15 sub-layer.

Logical Link Control (LLC) Sub-layer

Logical Link Control (LLC) sub-layer unit 15 may multiplex protocols running atop the data link layer, for example in high level multi-layer 12, and may provide flow control, acknowledgment, and error recovery. LLC sub-layer unit 15 may specify which mechanisms are to be used for addressing network entities over the physical medium and for controlling the data exchanged between the originator and recipient network nodes. According to embodiments of the present invention the LLC sub-layer unit 15 may be modified to support data transfer on more than a single physical medium. According to embodiments of the present invention each node in a communication network may be connected to more than one physical medium and therefore each node may have more then one physical address, one for each physical medium. While such arrangement may create a conflict for existing embodiments of communication models of the present invention may overcome this conflict, thus these embodiments may allow a higher level of network data flow taking advantage of multiple physical media.

According to one embodiment of the present invention certain functionalities which are typically implemented by Data Link layer 14, which handle addressing and identification of entities in the network, may be transferred from the MAC sub-layer units, such as units 16A and 16B, to higher logical network layers. Without a specific address assigned by a MAC sub-layer all data may be broadcast from each node to adjacent nodes on the physical layer. By transferring the function of local addressing from the MAC physical sub-layer, such as units 16A and 16B, to higher levels, a single and unique logical address may be created for a network node, as required to allow the control of the network according to embodiments of the present invention. Each node may be able to communicate with any other node by using the logical address of the node for purposes of addressing. According to this embodiment a communication message received via high level multi-layers 12 may be broadcast simultaneously on plurality of physical media connected to the network node, such as physical media $TM_A$, $TM_B$ of FIG. 1.

According to an additional embodiment of the present invention multiple physical addresses may be maintained and multiple data arrays, such as tables, for example look-up tables, may be administered to store the conversion values from physical address to logical address and vice versa.

For example, addressing table 1:

For MAC A may be:

| Physical address | Logical address |
|---|---|
| 1.1.1.1 | H.H.H.H |
| 2.2.2.2 | D.D.D.D |
| 3.3.3.3 | W.W.W.W |

And for MAC B table may be:

| Physical address | Logical address |
|---|---|
| 1.1.1.1 | Q.Q.Q.Q |
| 9.9.9.9 | D.D.D.D |
| 3.3.3.3 | E.E.E.E |

According to the above tables, a message to node H.H.H.H will be transmitted by physical layer A to the physical address 1.1.1.1 on physical medium A. Physical layer B does not recognize the physical address of this network node and will proceed according to the implemented action (for example transmit an "ARP request" to discover the node on this physical medium, or ignore this message). A message to node D.D.D.D will be transmitted by physical layer A to the physical address 2.2.2.2 on physical medium A, and simultaneously physical layer B will transmit the message to the physical address 9.9.9.9 on physical medium B. In this case node D.D.D.D has two different physical addresses, 2.2.2.2 assigned by MAC A and 9.9.9.9 assigned by MAC B.

Each frame from an upper layer may be translated, for example by MAC units 16A, 16B, into multiple frames containing the data from the original frame, and having the respective, translated physical addresses. These frames may be sent simultaneously on two or more of the respective physical media.

According to embodiments of the present invention LLC sub-layer 15 may use several MAC sub-layers 16A, 16B, etc. simultaneously. Each MAC sub-layer unit, such as MAC sub-layers 16A, 16B, may handle communication to and from its respective physical medium thus leaving for LLC sub-layer unit 15 to handle the differences between the different interfaces of MAC sub-layer units and to allow the usage of the different physical media in a transparent way by upper layers of communication unit 10 and of the communication network in which communication unit is active.

According to embodiments of the present invention a mechanism to detect and correct errors is disclosed. LLC sub-layer unit 15 may transmit data frames on more then a single physical layer, for example to two different physical media $TM_A$, $TM_B$, via physical sub-layers 18A and 18B and MAC sub-layers 16A and 16B, respectively. According to embodiment of the present invention in addition to known error detection and correction mechanisms, LLC sub-layer unit 15 may divide a data frame into data chunks. LLC sub-layer unit 15 may append to each chunk an integrity check expression thus creating a new data frame. The new data frame may be forwarded to the available MAC sub-layer units simultaneously for physical transmission. For example:

Original frame:

| header | Data |
|---|---|
| XXXX | 111111222222 |

Divided frame:

| header | Chunk 1 | Check | Chunk 2 | Check |
|---|---|---|---|---|
| XXXX | 111111 | OK | 222222 | OK |

Frame sent by MAC A:

| header | Chunk 1 | Check | Chunk 2 | Check |
|---|---|---|---|---|
| XXXX | 111111 | OK | 222222 | OK |

Frame sent by MAC B:

| header | Chunk 1 | Check | Chunk 2 | Check |
|---|---|---|---|---|
| XXXX | 111111 | OK | 222222 | OK |

Each frame of bytes is transferred on a different physical medium, each physical medium can have its own signaling, modulation and bit representation—this is a result of different mechanisms that are used to transform the digital data to analog signals on different physical media.

According to embodiments of the present invention an additional mechanism to detect and correct errors, in addition to the physical medium specific mechanisms used and mechanisms mentioned previously, is disclosed. LLC sub-layer unit 15 may receive inputs from more then a single physical layer, for example from two different physical media $TM_A$, $TM_B$, via physical sub-layer units 18A and 18B and MAC sub-layer units 16A and 16B. According to embodiment of the present invention instead of ignoring frames with errors the data may be buffered in LLC sub-layer unit 15 for a defined period of time even if errors in the payload were detected. The data frames that were received from more than one MAC sub-layer units may be synchronized. Each data frame is constructed of sub data chunks that include integrity indication. LLC sub-layer unit 15 may check the integrity of the data for each data chunk. A fast comparison may be done by LLC sub-layer 15 while rebuilding the original frame, using the correct chunks received from both MAC sub-layer units 16A and 16B indifferent of the physical medium providing the data. This may allow LLC sub-layer unit 15 to build one correct frame out of several erroneous frames, relying, for example, on the correct chunks of the data frames. As presented and explained above, the original data frame can be restored, despite errors caused, for example, by interferences on one or more of the different physical media, and may then be forwarded to the next network layer. This may increase probability of a correct frame transfer and thus improve the network performance, for example network throughput.

For example—LLC error correction:

Frame received by MAC A:

| header | Chunk 1 | Check | Chunk 2 | Check |
|---|---|---|---|---|
| XXXX | 111112 | Fail | 222222 | OK |

Frame received by MAC B:

| header | Chunk 1 | Check | Chunk 2 | Check |
|---|---|---|---|---|
| XXXX | 111111 | OK | 222221 | fail |

Buffered frame

| header | Chunk 1 from MAC B | Check | Chunk 2 from MAC A | Check |
|---|---|---|---|---|
| XXXX | 111111 | OK | 222222 | OK |

Final frame

| header | Chunk 1 | Chunk 2 |
|---|---|---|
| XXXX | 111111 | 222222 |

High-Level Layers

According to embodiments of the present invention above Data Link Layer 14 any network higher layers may be used, allowing the use of the communication solution of the present invention in a wide range of applications.

EXAMPLES

Home Internet networks

Home Internet network usually use a single physical medium, for example Wi-Fi, X-10, Ethernet, etc. Embodiments of the present invention enable to connect each computer, or similar end-point unit, to a single communication device, which may be connected to two or more physical media. Such devices may be designed according to the embodiments described above with respect to communication unit 10 so as to include an modified LLC sub-layer unit 15, connected, according to the example above, to both Wi-Fi and X-10 physical connections being TMa and TMb of FIG. 1, resulting in a much more reliable link and allow extending the existing range of each one of the physical media.

Alarm/Security Devices

Additionally or alternatively, embodiment of the present invention may ensure that sensors and other security devices will not be blocked when one of the physical media of a multi-medium network is tampered with, for example RF jam, COAX cable cut, etc.

Example of Automatic Meter Reading

Embodiments of the present invention may enable, in a mesh commnunication network connected to plurality of peripheral units, such as electrical meter, water meter, gas meter, energy meter, heating meter and the like, at its end-point devices, adding a communication module built and functioning according to embodiments of the present invention, to each peripheral unit, thus enabling an Automatic Meter Reading (AMR) system to be much more reliable, simple to install, and to cover wider areas.

Mesh Topology

In a Mesh network each of the network nodes, or end units may be interconnected with one or more other end units of the mesh network. The interconnection may be achieved through a dedicated connection between each of the nodes or through a shared physical medium. This allows most transmissions to be distributed, even if one or more of the connections between nodes goes down or is otherwise inactive. The following description will focus on the case of partially connected mesh networks only, for the sake of clarity. It will be appreciated by those skilled in the art that for other cases of faulty mesh network the principles and embodiments disclosed below with respect to partially connected mesh network may be easily modified to accommodate to these situations. The description and examples below shall include both controlled and uncontrolled mesh systems.

In a controlled Mesh network each device typically uses its logical ID in a routing path of a message from one point to another, so the sending device must identify the full path the message should pass in order to reach the destination point. The full path can be dynamically built by other device on the route. Typically in a mesh topology the sender node may have more than one path available to reach a receiving node. The network layer or higher levels in a communication model should define the paths and may run an algorithm to optimize the utilization of the topology. In a controlled network implementation according to embodiments of the present invention, one end-unit may be defined as a master device. This device may build a complete tree of the communication paths in the network using, for example, a minimum spanning tree (MST) algorithm implementation, and may use this tree as the default paths topology to al other end-units in the mesh network. Once a connection is declared down or broken, the master device may rebuild the MST of the communication paths to cover or compensate for the broken connection.

In an uncontrolled mesh network each end-point may automatically reroute the messages it receives to all adjacent end-points on the mesh, so the message is routed simultaneously in multiple paths towards the destination. This may ensure transfer of the data in a very robust way. In this method there is no specific path for the message to reach its destination. The network layer does not have to perform any addressing or routing. The network layer and data link layer 14 may be responsible for each message sent by any device to propagate and reach all other devices on the network. The lower Physical and Data link layers may perform all the control of the physical medium and the network layer simply retransmits any frame it receives.

Known mesh systems can operate in a single plain or in two dimensions, that is communication could propagate between end-points only via a single and common physical medium. All the nodes may be stationed in this physical medium, and data packets may be sent across it between near units. Choosing a different route in the same plain can solve interference in a communication path. However, known mesh systems can not provide a communication solution for an end-point that gets disconnected from all its sides, or connections in the physical medium.

A mesh communication system according to embodiments of the present invention may utilize a multi plain or a multi medium mesh network. Accordingly a mesh communication network according to embodiments of the invention may add one or more additional physical media, which may be considered parallel to a first one. According to yet additional embodiments of the present invention each of the mesh network physical media may be sensitive to certain types of disturbances, which may be different from one physical medium to another. Some or all of the end-points of a mesh network of the present invention may be connected to, or active in more than one of the physical media, and may communicate with each other via more than one physical medium and preferably via all available physical media. In case a certain end-point becomes unavailable via one physical medium, by-pass of the problem causing this unavailability may be performed via an alternative physical medium. Connection between one physical medium to another may be done at each end-point, which may act as a connection point for all physical media available for that end-point. Once interference causes one plain to be unusable for a unit, it doesn't affect the connection on the other plains, thus the unit stays connected to the entire network.

Figure 2:
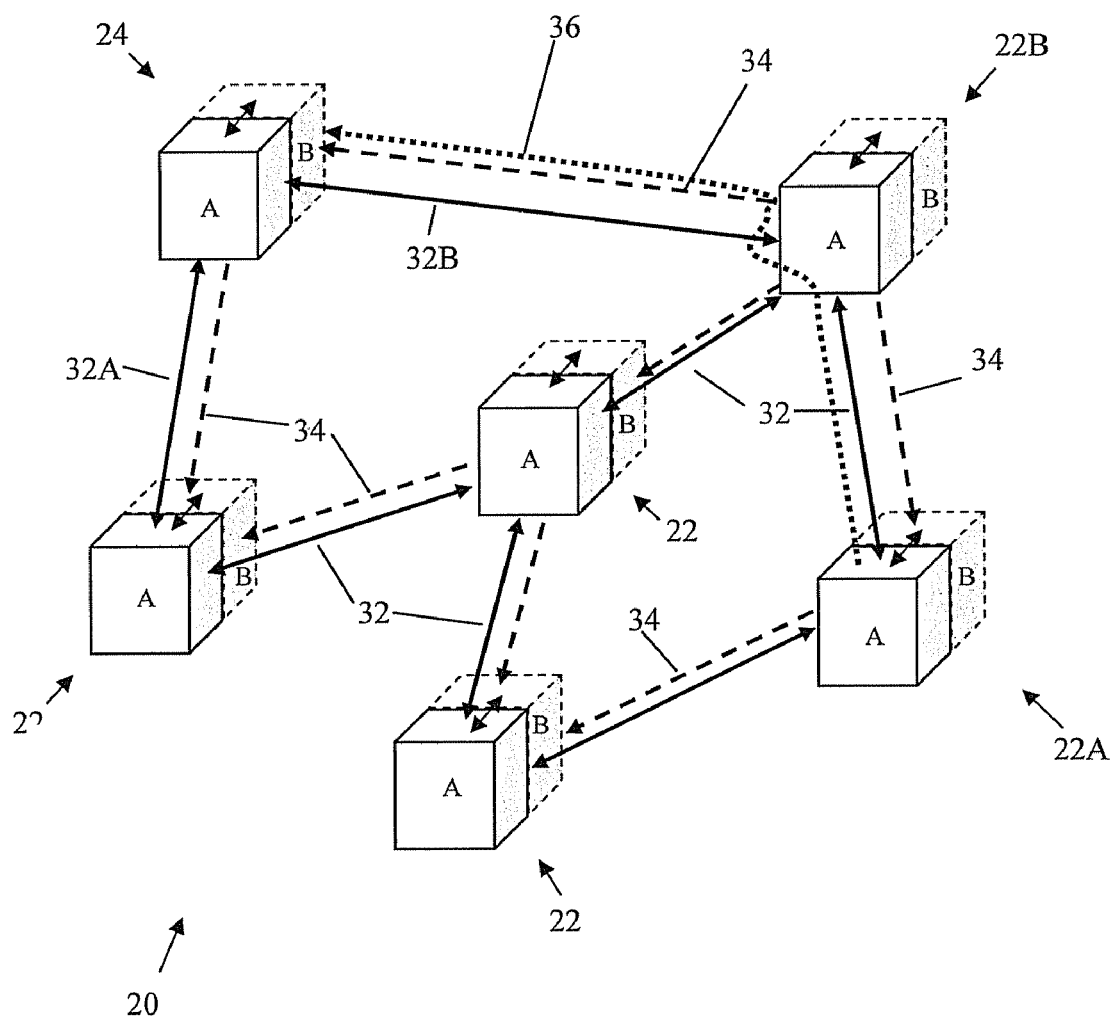
FIG. 2 is a schematic illustration of a multi medium mesh network, according to embodiments of the present invention.

Reference is made now to FIG. 2, which is a schematic illustration of a multi medium mesh network 20, according to embodiments of the present invention. Mesh network 20 may comprise a plurality of end-points 22, 24. At least some of end-points 22, 24 may be adapted to communicate via at least two physical media 32, 34 by, for example, having their lower level layers of the communication model adapted to communicate with, for example, physical medium 32, illustrated by the set of double headed arrows of solid line, via $TM_A$ and with physical medium 34, illustrated by the set of double headed arrows of dashed line, via, for example, $TM_B$. This spatial-like topology may be referred to as 3D topology.

In case end-point 24 is disconnected from physical medium 32 due to, for example, interferences in network branches 32A and 32B, messages from, for example, end-point 22A may travel towards end-point 24 of mesh network 20 via end-point 22B via physical medium 32, change to physical medium 34 at end-point 22B and travel to end-point 24 via physical medium 34, as illustrated by dotted line 36. It would be apparent to a person skilled in the art of the invention that physical media 32, 34 should not necessarily share all of their end-points with one another. Additionally it would be apparent that mesh network according to embodiments of the invention, such as mesh network 20, may comprise more than two physical media, which may all different from each other or may have at least some of them of the same type.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A communication network comprising:
a first physical medium connected to a plurality of nodes; and
a second physical medium;
wherein at least some of said nodes are connected to said second physical medium, and
wherein the characteristics of said first physical medium and the characteristic of said second physical medium limit the influence of interferences unique to said first physical medium on said second physical medium.

2. The communication network of claim 1, wherein said communication network is configured as a mesh network.

3. The communication network of claim 1, wherein said plurality of nodes are not associated with a physical address.

4. The communication network of claim 3, wherein said plurality of nodes are adapted to broadcast massages to adjacent nodes of said communication network on said first physical medium and said second physical medium.

5. The communication network of claim 1, wherein said plurality of nodes are associated each with one or more physical addresses.

6. The communication network of claim 5, wherein said physical addresses are addressable each by one or more of said first physical medium and said second physical medium which said node is connected to.

7. A node in a communication network implementing an hierarchical communication model, the node comprising:
a physical layer comprising a plurality of physical layer units at least some of said plurality of physical layer units are connected each to one of a first physical and a second physical medium and to one of different media access control units, said physical layer units to transfer data between said respective physical media and respective media access control units, wherein the characteristics of said first physical medium and the characteristic of said second physical medium limit the influence of interferences unique to said first physical medium on said second physical medium;
a data link layer comprising:
a media access control layer comprising a plurality of media access control units, each connected to a one of said physical layer units, said media access control units to handle communication with said respective physical layer units;
a logical link control layer comprising a single logical link control unit connected to said media access control units and to a communication unit to support data transfer between said communication unit and said media access control units, said logical link control unit is further to provide flow control acknowledgment and error recovery mechanisms to specify which mechanisms are to be used for addressing other network nodes over said communication network, and to forward massages sent between other nodes of said communication network; and
a communication layer comprising said communication unit connected to said logical link control unit to support network, transport, session, presentation and application layers of the hierarchical communication model.

8. The node of claim 7, wherein said communication unit uses said first and said second physical media of said communication network in a transparent way.

9. The node of claim 7, wherein said data is divided to data frames.

10. The node of claim 7, further comprising interface means to communicate with at least one peripheral unit.

11. The node of claim 10, wherein said peripheral unit is at least one of a list comprising: electrical meter, water meter, gas meter, energy meter and heating meter.

12. The node of claim 7, wherein said hierarchical communication model is the OSI model.

13. The node of claim 7, wherein said error recovery mechanism comprising:
while transmitting:
dividing original data frames into a plurality of data chunks;
appending an integrity check expression to each chunk;
creating new data frames including said data chunks and said integrity check expression of said chunks; and
transmitting said new data frames to at least one other node on said first and said second physical media; and while receiving:
receiving a plurality of copies of said new data frames from said communication network on said first and said second physical media;
checking for errors at a payload of said new data frames;
looking for matching new data frame with no errors that was received on other physical media of said first and said second physical media if an error is found at the payload of a new data frame;
if no matching new data frame with no errors is found:
buffering said matching new data frames with errors;
checking the integrity of the data for each said data chunk of each said matching new data frames with errors; and
rebuilding the original frame, using the correct chunks received on said plurality of physical media.

14. A method for creating a communication network by communicating on a first physical media medium and a second physical medium, each connected to a plurality of network nodes, the method comprising:
for at least some of said network nodes:
connecting a plurality of physical layer units of a single network node each to a respective physical medium;
handling communication on said physical medium by respective physical layer units, media access control units and a logical link control unit; and
transferring massages among said plurality of network nodes on said first physical medium and said second physical medium,
wherein the characteristics of said first physical medium and the characteristic of said second physical medium limit the influence of interferences unique to said first physical medium on said second physical medium.

15. The method of claim 14, wherein said transfer of massages among said network nodes on said first physical medium and said second physical medium is done in a transparent way by upper layers of communication unit of said network nodes.

16. The method of claim 14, wherein said communication network is configured as mesh network.

17. The method of claim 14, wherein said plurality of network nodes are not associated with a physical address.

18. The method of claim 17, further comprising broadcasting massages to adjacent nodes across said communication network on said first physical medium and said second physical medium.

19. The method of claim 14, wherein said plurality of network nodes are associated with one or more physical addresses.

20. A method for communicating with a plurality of network nodes of a communication network on a first physical medium and a second physical medium, the method comprising:
performing hardware-specific operations to affect transmission and reception of electronic signals to and from said first physical medium and said second physical medium;
translating said electronic signals received on said first physical medium and said second physical medium into data frames;
providing flow control, acknowledgment, and error recovery mechanisms for said data frames sent and received on said first physical medium and said second physical medium;
specifying which mechanisms are to be used for addressing other network nodes over said communication network;
forwarding massages sent between other nodes of said communication network; and
supporting functions of network, transport, session, presentation and application,
wherein the characteristics of said first physical medium and the characteristic of said second physical medium limit the influence of interferences unique to said first physical medium on said second physical medium.

21. The method of claim 20, wherein said first physical medium and said second physical medium are used by said functions of network, transport, session, presentation and application in a transparent way.

22. The method of claim 20, further comprising communicating with at least one peripheral unit.

23. The method of claim 22, wherein said peripheral unit is at least one of a list comprising: electrical meter, water meter, gas meter, energy meter and heating meter.

24. The method of claim 20, said error recovery mechanisms comprising:
while transmitting:
dividing original data frames into a plurality of data chunks;
appending an integrity check expression to each chunk;
creating new data frames including said data chunks and said integrity check expression of said chunks; and
transmitting said new data frames to at least one other node of said plurality of network nodes on said first physical medium and said second physical medium; and
while receiving:
receiving a plurality of copies of said new data frames from said communication network on said first physical medium and said second physical medium;
checking for errors at a payload of said new data frames;
looking for matching new data frame with no errors that was received on another physical medium of said first physical medium or said second physical medium if an error is found at the payload of a new data frame;
if no matching new data frame with no errors is found:
buffering said matching new data frames with errors;
checking the integrity of the data for each said data chunk of each said matching new data frames with errors; and
rebuilding the original frame, using the correct chunks received on said first physical medium and said second physical medium.

* * * * *